(12) United States Patent
Dharamshi et al.

(10) Patent No.: US 11,008,015 B2
(45) Date of Patent: May 18, 2021

(54) METHOD AND DEVICE FOR DETERMINING A WHEEL LOAD ACTING ON A WHEEL OF A VEHICLE, AND METHOD AND DEVICE FOR DETERMINING A WEIGHT OF A VEHICLE

(71) Applicant: CONTINENTAL AUTOMOTIVE GMBH, Hannover (DE)

(72) Inventors: Parthiv Dharamshi, Regensburg (DE); Matthias Kretschmann, Wenzenbach (DE)

(73) Assignee: Continental Automotive GmbH, Hannover (DE)

(*) Notice: Subject to any disclaimer, the term of this patent is extended or adjusted under 35 U.S.C. 154(b) by 263 days.

(21) Appl. No.: 16/333,379

(22) PCT Filed: Sep. 15, 2017

(86) PCT No.: PCT/EP2017/073262
§ 371 (c)(1),
(2) Date: Mar. 14, 2019

(87) PCT Pub. No.: WO2018/050813
PCT Pub. Date: Mar. 22, 2018

(65) Prior Publication Data
US 2019/0210609 A1    Jul. 11, 2019

(30) Foreign Application Priority Data
Sep. 15, 2016    (GB) ..................... 1615674

(51) Int. Cl.
*B60C 23/04*    (2006.01)
*B60W 40/12*    (2012.01)
(Continued)

(52) U.S. Cl.
CPC ............ *B60W 40/13* (2013.01); *B60C 23/04* (2013.01); *B60C 23/0408* (2013.01);
(Continued)

(58) Field of Classification Search
CPC . B60C 23/04; B60C 23/0408; B60C 23/0474; B60C 23/064; B60C 23/0433;
(Continued)

(56) References Cited

U.S. PATENT DOCUMENTS 8,255,114 B2    8/2012   Fink et al.
8,844,346 B1    9/2014   Singh et al.
(Continued)

FOREIGN PATENT DOCUMENTS

DE           10329700 A1     1/2005
DE       102006033951 A1    10/2007
(Continued)

*Primary Examiner* — Tan Q Nguyen
(74) *Attorney, Agent, or Firm* — Laurence A. Greenberg; Werner H. Stemer; Ralph E. Locher

(57) ABSTRACT

A method for determining a wheel load acting on a vehicle wheel having a rim, a tire mounted on the rim and a sensor unit mounted at the wheel, includes determining a tire pressure of the tire using the sensor unit, determining a tire footprint of the tire using the sensor unit when the vehicle is driving, determining the wheel load based on a predetermined relationship between the wheel load, the tire pressure and the tire footprint, analyzing temporal variations of the tire pressure during a standstill of the vehicle for determining one or more parameters indicating temporal variations of the tire pressure. A change of the wheel load during the standstill is estimated based on the determined parameters. A device for determining a wheel load and a method and a device for determining a weight of a vehicle are also provided.

19 Claims, 4 Drawing Sheets

(51) Int. Cl.
*B60W 40/13* (2012.01)
*G01G 19/10* (2006.01)
*B60C 23/06* (2006.01)

(52) U.S. Cl.
CPC ........ *B60C 23/0474* (2013.01); *B60C 23/064* (2013.01); *B60W 40/12* (2013.01); *G01G 19/10* (2013.01); *B60C 23/0433* (2013.01); *B60W 2040/1307* (2013.01)

(58) Field of Classification Search
CPC .......... B60C 2040/1307; B60W 40/13; B60W 40/12; G01G 19/00; G01G 19/08
See application file for complete search history.

(56) References Cited

U.S. PATENT DOCUMENTS

| | | | |
|---|---|---|---|
| 9,222,854 | B2 | 12/2015 | Singh et al. |
| 2002/0019685 | A1 | 2/2002 | Ries-Mueller |
| 2008/0281552 | A1* | 11/2008 | Irth ...................... G01G 19/086 702/138 |
| 2010/0063669 | A1* | 3/2010 | Fink .................... B60C 23/0416 701/29.6 |
| 2014/0008132 | A1 | 1/2014 | Kamamann et al. |
| 2015/0005982 | A1* | 1/2015 | Muthukumar .......... G01P 15/00 701/1 |
| 2015/0019165 | A1 | 1/2015 | Theuss et al. |
| 2016/0075306 | A1* | 3/2016 | Utter ................... B60C 23/0408 340/426.31 |
| 2016/0200155 | A1* | 7/2016 | Steinmeyer ............. B60C 23/06 73/146.2 |
| 2019/0047334 | A1* | 2/2019 | Chidlow ............. B60C 23/0408 |

FOREIGN PATENT DOCUMENTS

| | | |
|---|---|---|
| DE | 102008046269 B3 | 12/2009 |
| DE | 102013208404 A1 | 11/2014 |
| EP | 2774784 A1 | 9/2014 |
| EP | 2778631 A2 | 9/2014 |
| GB | 2533658 A | 6/2016 |

* cited by examiner

METHOD AND DEVICE FOR DETERMINING A WHEEL LOAD ACTING ON A WHEEL OF A VEHICLE, AND METHOD AND DEVICE FOR DETERMINING A WEIGHT OF A VEHICLE

Method and device for determining a wheel load acting on a wheel of a vehicle, and method and device for determining a weight of a vehicle.

BACKGROUND OF THE INVENTION

Field of the Invention

The present invention relates to a method for determining a wheel load acting on a wheel of a vehicle, wherein the wheel comprises a rim and a tire mounted onto the rim, and a sensor unit mounted at the wheel. Further, the invention relates to a method for determining a weight of a vehicle, a computer program product, a device for determining a wheel load, and a device for determining a weight of a vehicle.

A method and a device for determining a wheel load are disclosed in DE 10 2006 033 951 A1. According to this document, the wheel load is determined based on previously determined tire pressure and tire footprint. As the determination of the tire footprint necessitates that the vehicle is driving, an up to date determination of the wheel load also necessitates that the vehicle is driving.

SUMMARY OF THE INVENTION

It is an object of the present invention to provide a method and a device for determining a wheel load which provide an up to date indication of the wheel load also during standstill periods of the vehicle.

An aspect of the present invention relates to a method for determining a wheel load acting on a wheel of a vehicle, wherein the wheel comprises a rim and a tire mounted onto the rim, and a sensor unit mounted at the wheel, and wherein the method comprises
 a) determining a tire pressure of the tire by means of the sensor unit,
 b) determining a tire footprint of the tire by means of the sensor unit, when the vehicle is driving,
 c) determining the wheel load based on a predetermined relationship between the wheel load, the tire pressure and the tire footprint,
 d) analysing temporal variations of the tire pressure during a standstill period of the vehicle for determining one or more parameters indicating the temporal variations of the tire pressure, and
 e) estimating a change of the wheel load during the standstill period based on the one or more determined parameters.

Said method advantageously allows for estimating changes of the wheel load and thus an up to date indication of the wheel load during standstill periods of the vehicle as will be explained in more detail in the following. Further, based on the determined (estimated) wheel loads of all wheels, it is possible to determine the weight of the vehicle and in particular e.g. a possible overload condition of the vehicle also during such standstill periods.

The method according to said aspect of the invention is based on the consideration that a change (i.e. an increase or decrease) of the wheel load during a standstill period causes typical temporal variations of the tire pressure (s), so that the analysis of the temporal variations of one or more tire pressures, which is preferably conducted by means of software running on a computer means, allows for estimating an actual change of the wheel load (s) and thus an estimation of the actual wheel load(s).

In an embodiment, the method further comprises f) determining a current value of the wheel load after the standstill period based on the estimated change of the wheel load during the standstill period and the wheel load determined in step c).

Typically, the temporal variations of a tire pressure caused by changes of the wheel load are relatively small. Therefore, according to an embodiment, the tire pressure is determined in step a) with an accuracy of better than 2.5 kpa.

In an embodiment, determining the tire footprint in step b) comprises
 b1) determining a rotational speed of the wheel,
 b2) analysing a temporal variation of a sensor signal determined by the sensor unit, in particular e.g. a sensor signal representing an acceleration, e.g. a radial acceleration,
 b3) determining the tire footprint based on a predetermined relationship between the tire footprint, the rotational speed and the temporal variation of the sensor signal.

In an embodiment, determining the wheel load in step c) comprises retrieving the wheel load from a look-up table representing the relationship between the wheel load, the tire pressure and the tire footprint. The look-up table may be stored e.g. in the sensor unit. Alternatively, it may be stored e.g. in a central control unit of the vehicle.

In an embodiment, the one or more parameters determined in step d) indicate the occurrence of sudden changes of the tire pressure.

As used here and in the remaining part of the description, a "sudden change of the tire pressure" means a change of the tire pressure that exceeds a predetermined pressure change threshold within a predetermined time period.

The sudden changes of the tire pressure may comprise e.g. sudden rises and/or sudden falls of the tire pressure.

The one or more parameters determined in step d) may indicate a number of the sudden changes.

In particular, the one or more parameters determined in step d) may indicate an accumulated number of the sudden changes during the standstill period counted by a counter, wherein a value of the counter is increased for a sudden rise of the tire pressure and the value of the counter is decreased for a sudden fall of the tire pressure or vice versa.

Alternatively or in addition, the one or more parameters determined in step d) may indicate a quantitative value of the sudden changes.

Alternatively or in addition, the one or more parameters determined in step d) may indicate a temporal variation of the tire pressure after the sudden changes.

In an embodiment, estimating the change of the wheel load in step e) comprises calculating a change of the wheel load based on one or more mathematical equations. Such calculations may take place e.g. in the sensor unit. Alternatively or in addition, corresponding calculations may be conducted e.g. in a central control unit of the vehicle.

According to a further aspect of the present invention, a method for determining a weight of a vehicle comprising a plurality of wheels is provided, wherein each wheel comprises a rim and a tire mounted onto the rim, and a sensor unit mounted at the wheel, and wherein the method comprises A) determining a wheel load of each of the wheels using a method according to any of the embodiments described above, B) determining the weight of the vehicle based on the determined wheel loads of the wheels.

This Method May Further Comprise:

C) analysing correlations between the one or more parameters determined in step d) for one of the wheels and the parameters determined in step d) for at least one other wheel of the plurality of wheels, D) improving an estimation quality of step e) based on a result of the analysis in step C).

As an analysis of said correlations necessitates a knowledge of the determined parameters of at least two different wheels, such analysis can be conducted e.g. in a central control unit of the vehicle, which determines or receives such parameters of different wheels, e.g. of all wheels of the vehicle.

According to a further aspect of the invention, a computer program product comprising software code for performing the steps of any of the methods described above when said software code is run on a computer device is provided.

According to further aspects of the invention, a device for determining a wheel load and a device for determining a weight of a vehicle, respectively, are provided.

The device for determining a wheel load acting on a wheel of a vehicle, wherein the wheel comprises a rim and a tire mounted onto the rim, and a sensor unit mounted at the wheel comprises a) means for determining a tire pressure of the tire by means of the sensor unit, b) means for determining a tire footprint of the tire by means of the sensor unit, when the vehicle is driving, c) means for determining the wheel load based on a predetermined relationship between the wheel load, the tire pressure and the tire footprint, d) means for analysing temporal variations of the tire pressure during a standstill period of the vehicle for determining one or more parameters indicating the temporal variations of the tire pressure, and e) means for estimating a change of the wheel load during the standstill period based on the one or more determined parameters.

In an embodiment, the device for determining a wheel load further comprises f) means for determining a current value of the wheel load after the standstill period based on the estimated change of the wheel load during the standstill period and the wheel load determined by the means for determining the wheel load.

The device for determining a weight of a vehicle comprising a plurality of wheels, wherein each wheel comprises a rim and a tire mounted onto the rim, and a sensor unit mounted at the wheel comprises A) means for determining a wheel load of each of the wheels using the device for determining a wheel load acting on a wheel according to any of the embodiments described above, B) means for determining the weight of the vehicle based on the determined wheel loads of the wheels.

BRIEF DESCRIPTION OF THE SEVERAL VIEWS OF THE DRAWING

The invention will now be described in more detail by way of example embodiments with reference to the accompanying drawings, in which.

DESCRIPTION OF THE INVENTION

Figure 1:
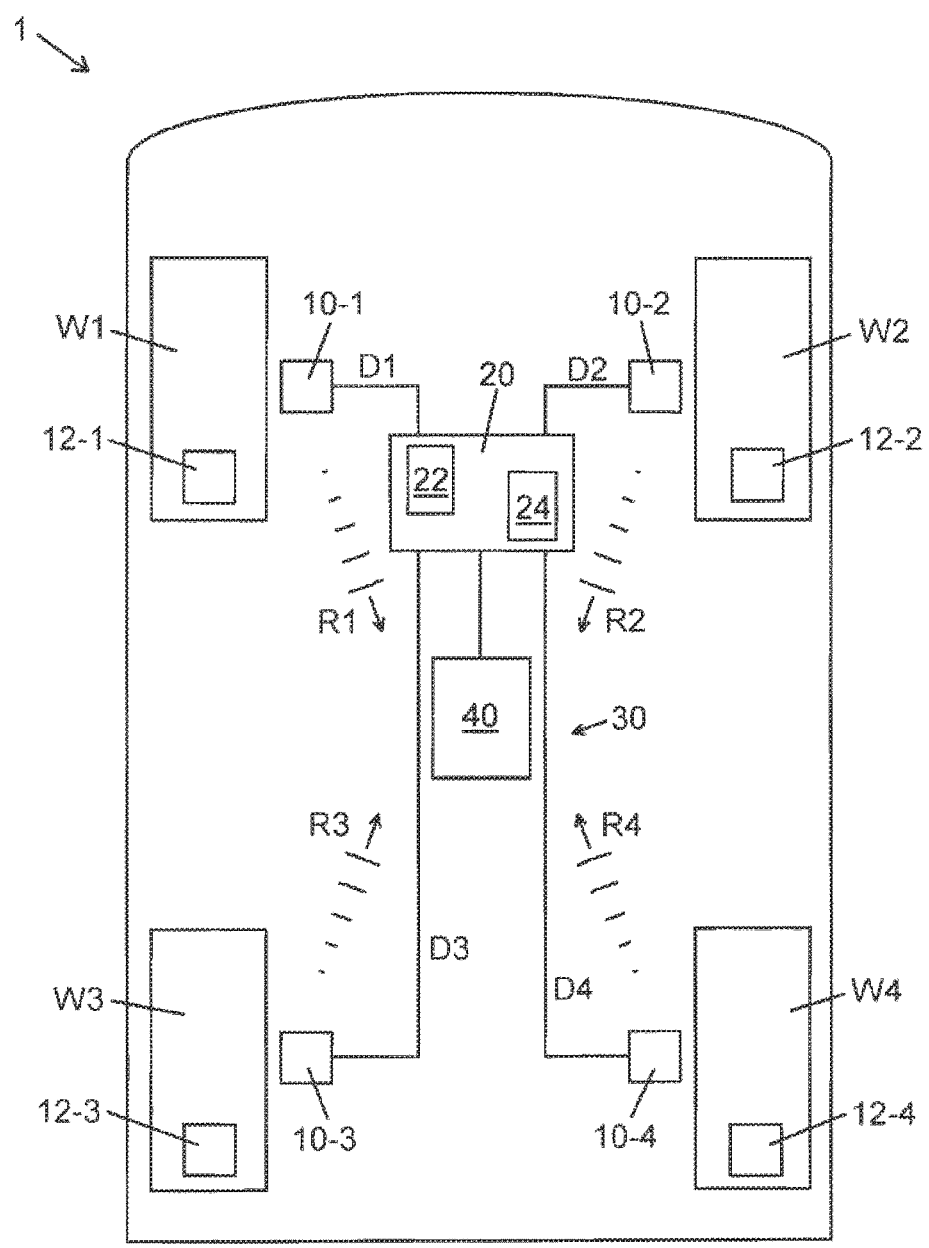
FIG. 1 illustrates a schematic plan view of a vehicle equipped with a device for determining wheel loads and for determining a weight of the vehicle according to an embodiment.

FIG. 1 illustrates a vehicle 1 (e.g. a passenger car) having four wheels W1, W2, W3 and W4.

The vehicle 1 is equipped with vehicle-based sensor units 10-1, 10-2, 10-3 and 10-4 (each mounted at the vehicle 1) and wheel-based sensor units 12-1, 12-2, 12-3 and 12-4 (each mounted at a respective one of the wheels W1 to W4).

The sensor units 10-1 to 10-4 are each configured for measuring a rotational position and/or a rotational speed of the respective one of the wheels W1 to W4 and for transferring respective data signals D1, D2, D3 and D4 to a central electronic control unit (ECU) 20 of the vehicle 1.

The data signals D1 to D4 each represent the rotational position and/or the rotational speed of one of the wheels W1 to W4.

The electronic control unit 20 is implemented as a computer (e.g. a microcontroller) equipped with a digital storage 22 (storing software and data) and a data processing unit 24 and uses the information transferred by the data signals D1 to D4 e.g. for controlling safety functions of the vehicle 1, as e.g. an anti-wheel-lock braking system and/or an electronic stabilizing system.

The sensor units 12-1 to 12-4 are each configured for determining a respective one of tire pressures p1, p2, p3 and p4 of the tires of the wheels W1 to W4, and for determining a parameter indicative of a tire footprint (e.g. a tire footprint length 11, 12, 13 and 14, respectively) of the tire of the wheel W1, W2, W3 and W4, respectively, at which the respective sensor unit 12-1, 12-2, 12-3 and 12-4 is mounted.

Furthermore, the sensor units 12-1 to 12-4 are each configured for sending a respective RF data signal R1, R2, R3 and R4 containing information representing the determined tire pressure and the determined tire footprint parameter for the respective wheel to a central RF receiver 40 of the vehicle 1.

The RF receiver 40 is coupled to the electronic control unit 20 in order to communicate digital representations of the RF data signals R1 to R4 to the electronic control unit 20.

The information representing the tire pressures p1 to p4 and the tire footprint lengths 11 to 14 which is received by the electronic control unit 20 can be advantageously used e.g. for issuing a warning to the driver of the vehicle, if the information received from one or more of the sensor units 12-1 to 12-4 indicate a fault condition of the respective wheel (e.g. caused by a loss of air from the respective tire).

Thus, the sensor units 12-1 to 12-4 in connection with the RF receiver 40 and the control unit 20 constitute a so-called tire pressure monitoring system (TPMS) of the vehicle 1.

In this TPMS, also the vehicle-based sensor units 10-1 to 10-4 can be advantageously used, namely for realizing a so-called localization functionality, by analysing correlations between information about rotational position and/or rotational speed of the wheels W1 to W4 provided by the vehicle-based sensor units 10-1 to 10-4 on the one hand, and determined by the wheel-based sensor units 12-1 to 12-4 on the other hand.

With such localization, the electronic control unit 20 can correctly assign each of the RF data signals R1 to R4 (or each of the wheel-based sensor units 12-1 to 12-4) to the corresponding wheel position at the vehicle 1.

In the illustrated example, the wheel positions are: "front left" (wheel W1), "front right" (wheel W2), "rear left" (wheel W3) and "rear right" (wheel W4).

Hereinafter, the structure of the sensor units 12-1 to 12-4, which is identical for the sensor units 12-1 to 12-4, will be described with reference to FIG. 2.

Figure 2:
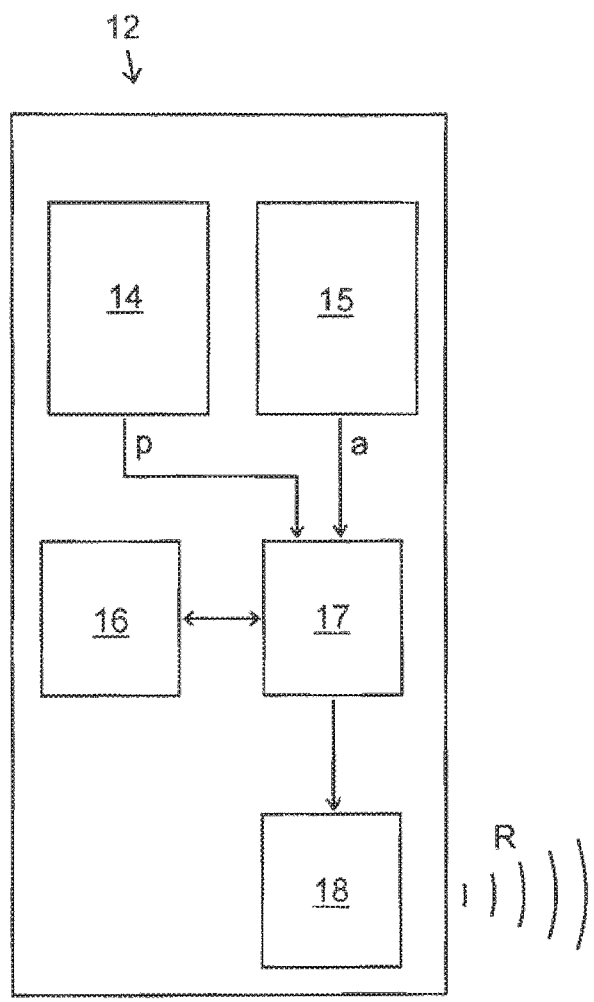
FIG. 2 illustrates a block diagram of a sensor unit used in the device of the vehicle of FIG. 1.

FIG. 2 illustrates a sensor unit 12, comprising a pressure sensor 14 for measuring a pressure "p" inside the tire of the wheel at which the sensor unit 12 is mounted.

The measured pressure p is communicated to a digital data processing unit (e.g. a microcontroller) 17 which is coupled to a digital storage 16 (storing software and data) and which generates data to be sent as an RF data signal R by means of an RF transmitter 18.

Further, the sensor unit 12 comprises an acceleration sensor 15 for measuring a radial acceleration "a", which is also communicated to the processing unit 17.

When the vehicle 1 is driving and thus the wheels W1 to W4 are rotating, the processing unit 17 analyses the time-dependent acceleration "a" for determining a rotational speed of the respective wheel.

Further, the processing unit 17 analyses a temporal variation of the sensor signal determined by the sensor 15 for determining the tire footprint length "l" of the respective tire based on a predetermined relationship between the tire footprint length, the rotational speed of the wheel and the temporal variation of the sensor signal.

Namely, the sensor signal representing the acceleration "a" contains typical signal features, when the sensor unit 12 enters and exits the contact area between the tire and the surface being driven on by the vehicle 1.

Thus, the RF data signal R includes information representing the present tire pressure "p" as well as the present footprint length "l".

In the vehicle 1, the sensor units 12-1 to 12-4 together with the RF receiver 40 and the control unit 20 constitute also a device for determining wheel loads WL acting on the wheels W1 to W4, and for determining a weight of the vehicle 1 based on the determined wheel loads WL.

When the vehicle 1 is driving, the determination of the wheel load WL for each of the wheels W1 to W4 is based on a predetermined relationship between the wheel load WL, the tire pressure p and the tire footprint (as represented here e.g. by the tire footprint length l).

Somewhat simplified (assuming a rectangular footprint with footprint length l and footprint width w), said relationship can be expressed as follows:

$$WL = p \times l \times w$$

wherein WL is the wheel load, p is the tire pressure, l is the footprint length, and w is the footprint width.

Due to the operation principle of commonly used wheel-based sensor units with regard to the determination of the tire footprint, this determination necessitates that the respective wheel rotates, i.e. that the vehicle 1 is driving. Consequently, in prior art systems, it is not possible to measure the tire footprint during standstill periods of the vehicle and to determine an up to date wheel load WL e.g. based on the above mathematical relationship.

In the illustrated vehicle 1, however, this drawback is overcome by means of the following additional steps conducted by the processing unit 17 (of each of the sensor units 12-1 to 12-4) and/or the vehicle-based control unit 20:

analysing temporal variations of the tire pressure p during a standstill period of the vehicle 1 for determining one or more parameters indicating the temporal variations of the tire pressure p, and estimating a change dWL of the wheel load WL during the standstill period based on the one or more determined parameters.

According to the present invention, an up to date determination or estimation of the wheel load WL is thus also possible during standstill periods of the vehicle 1 by analysing temporal variations of the tire pressure p during these standstill periods and subsequently estimating a possible change dWL of the wheel load WL during the standstill periods.

This determination of a possible change dWL of the wheel load WL is based on the consideration that a change dWL of the wheel load WL causes at least transient temporal variations of the tire pressure p, which creates the possibility of deducing an actual change dWL of the wheel load WL in the above described manner.

Moreover, the processing unit 17 (of each of the sensor units 12-1 to 12-4) and/or the vehicle-based control unit 20 may determine a current value of the wheel load WL after the standstill period based on the estimated change dWL of the wheel load WL during the standstill period and the previously determined wheel load WL, i.e. the wheel load WL determined before the standstill period.

Figure 3:
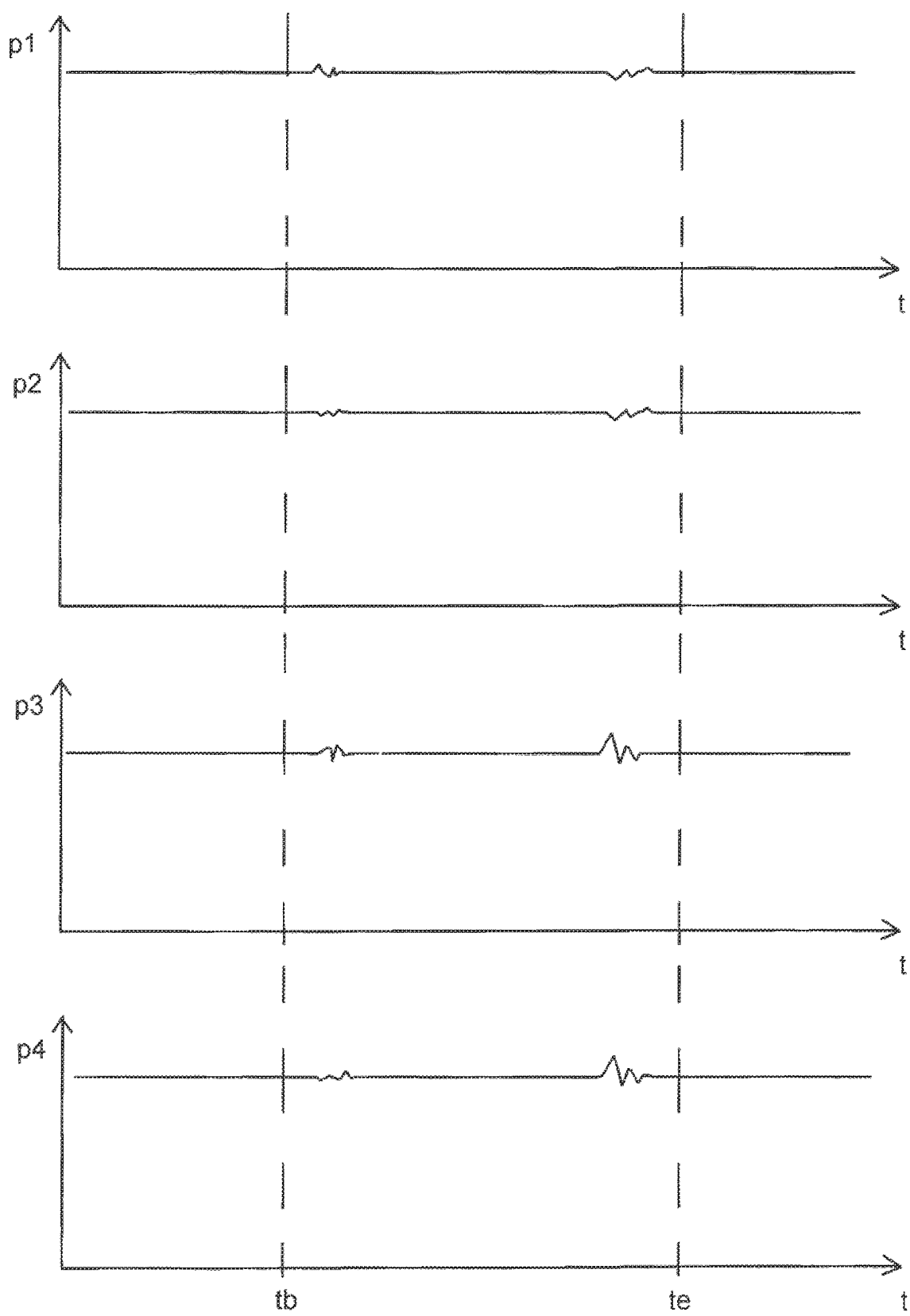
FIG. 3 illustrates a diagram illustrating tire pressures as a function of time.

FIG. 3 illustrates an example of tire pressures p1, p2, p3 and p4 measured by the sensor units 12-1, 12-2, 12-3 and 12-4, respectively, as a function of the time t during a standstill period of the vehicle 1.

In FIG. 3, the beginning or the start of the standstill period is designated by "tb" and the end or the finish of the standstill period is designated by "te".

In the example of FIG. 3, it is assumed that after the moment tb, a driver leaves the vehicle 1, and after a while returns to the vehicle 1 for loading a heavy piece of luggage into a luggage compartment at the rear of the vehicle 1.

When the driver leaves the vehicle 1, there will arise temporal variations (e.g. comprising sudden changes and/or small oscillations) of one or more of the tire pressures p1 to p4. When leaving the vehicle 1 takes place e.g. near the front left wheel W1, such temporal variations will be more significant or pronounced in the pressure p1 than in the other pressures p2 to p4.

Subsequently, when the piece of luggage will be loaded into the luggage compartment, there will arise corresponding temporal variations of one or more of the pressures p1 to p4 again, wherein in case of an arrangement of the luggage compartment at the rear of the vehicle 1, these temporal variations are more pronounced in the pressures p3 and p4 (at the rear wheels W3 and W4) than in the other pressures p1 and p2 (at the front wheels W1 and W2).

In the illustrated embodiment, the analysis of such temporal variations of the tire pressures p1 to p4 during standstill periods of the vehicle 1 is conducted by the vehicle-based electronic control unit 20 based on information received by means of the RF data signals R1 to R4.

In a first step, the electronic control unit 20 analyses the temporal variations for determining one or more parameters indicating the temporal variations of the tire pressures p1 to p4.

Such parameters may e.g. indicate the occurrence of sudden rises and/or sudden falls of the tire pressure, as e.g. apparent in the tire pressures p1 to p4 illustrated in FIG. 3. Further, such parameters may indicate a number (e.g. an accumulated number since the moment "tb") and/or an amount of prevalence (e.g. a mean temporal frequency) of the sudden changes, and/or a quantitative value of the sudden changes (cf. e.g. the peak heights in FIG. 3). Finally, such parameters may also take into account temporal variations of the tire pressures immediately after the occurrence of such sudden changes (cf. e.g. the oscillations in the tire pressures p1 to p4 illustrated in FIG. 3).

In a second step, the electronic control unit 20 estimates a change dWL of the wheel load WL for each of the wheels W1 to W4, wherein this estimation is based on the previously determined one or more parameters.

In this step, the electronic control unit 20 also calculates an up to date wheel load WL for each wheel by adding the determined (estimated) change dWL and the previously determined wheel load WL (determined before the moment "tb") for each wheel. Finally, in this step, the determination of dWL and based thereon the determination of WL for each wheel can be updated (repeated) from time to time (e.g. periodically) as long as the standstill period lasts (until the moment "te").

Advantageously, the electronic control unit 20 may also analyse correlations between the parameters determined for each of the wheels W1 to W4 in order to improve the quality of estimation of dWL for each of the wheels W1 to W4.

In a third step, the electronic control unit 20 calculates a weight of the vehicle 1 by adding the determined wheel loads WL of all wheels W1 to W4. If, during the standstill period, this weight exceeds a predetermined threshold, the electronic control unit 20 initiates the issuance of a warning e.g. by means of on-board signalling means of the vehicle 1 and/or remote communication (e.g. by means of a message sent to an electronic mobile device of the driver and/or other users).

In a further embodiment, the analysis of temporal variations of the tire pressures p1 to p4 during standstill periods of the vehicle 1 is conducted by the sensor units 12-1, 12-2, 12-3 and 12-4, respectively. To this end, the sensor unit 12-1 analyses temporal variations of the tire pressure p1, the sensor unit 12-2 analyses temporal variations of the tire pressure p2, the sensor unit 12-3 analyses temporal variations of the tire pressure p3, and the sensor unit 12-4 analyses temporal variations of the tire pressure p4 as will be explained in more detail with reference to FIG. 4.

Figure 4:
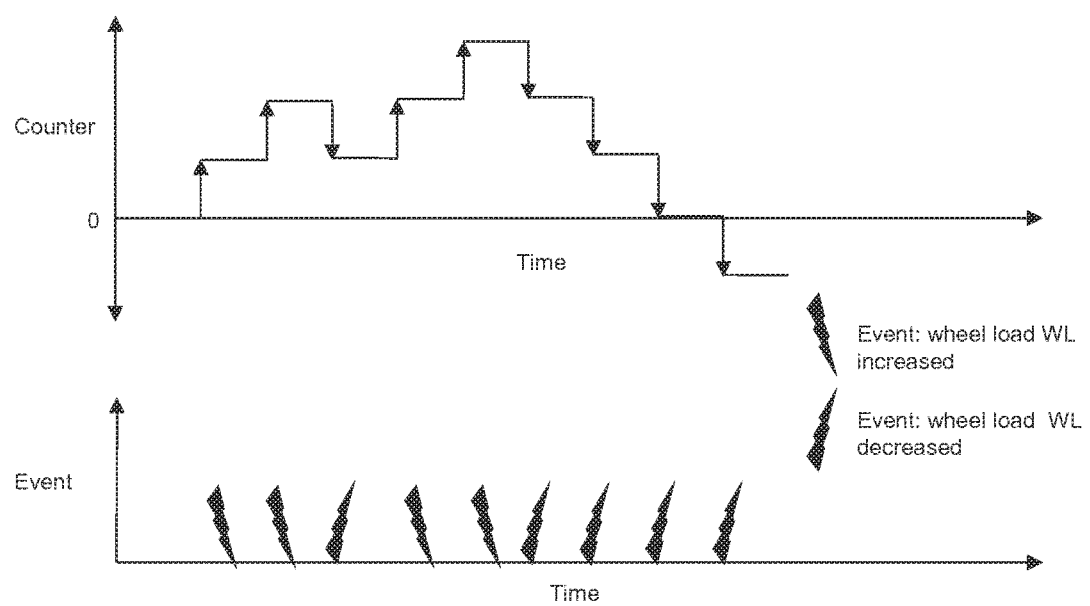
FIG. 4 illustrates a counting scenario during a standstill period of the vehicle of FIG. 1.

FIG. 4 illustrates a counting scenario during a standstill period of the vehicle 1.

As already explained above, when the wheel load WL changes, the tire pressure changes and there is a differential pressure change over a short time period. High resolution pressure sensors can measure such small pressure changes and pressure gradients. These measurements indicate whether the wheel load WL increased or decreased. The wheel load increment and decrement judgment is based on wheel load increment and decrement thresholds.

During a standstill situation of the vehicle 1, pressure data of the high resolution and precision pressure sensor 14 contained in each of the sensor units 12-1, 12-2, 12-3 and 12-4 is used to confirm a change of the wheel load WL. When a change of the wheel load WL is determined, a counter counting the number of changes of the wheel load WL is increased or decreased accordingly. In the illustrated embodiment, for every increase or increment of the wheel load WL, the counter counts one positive value, whereas for every decrease or decrement of the wheel load WL, the counter counts one negative value. Thus, an increment or decrement of the wheel load WL can be indicated by the counter value. During standstill of the vehicle 1, it is possible to update this counter value indicating the change of the wheel load WL periodically.

Upon motion of the vehicle 1, the sensor units 12-1, 12-2, 12-3 and 12-4 can communicate the respective current counter value to the electronic control unit 20 as part of the RF data signals R1 to R4, respectively. The counter values can be positive or negative, indicating an increase or a decrease of the wheel load WL, respectively. The electronic control unit 20 can then provide an estimation of the current wheel load WL for each wheel by considering the estimated change of the wheel load WL as indicated by the counter value for the wheel load WL which was determined before the standstill of the vehicle 1.

In particular, if the counter value is equal to zero, the respective RF data signal may contain a flag indicating that the wheel load WL of the respective wheel did not change during the standstill of the vehicle 1. In this case, determining the tire footprint of the respective tire by means of the sensor unit 12 when the vehicle 1 is driving again after the standstill period of the vehicle 1 may be omitted for a predetermined time period by the sensor unit 12, thereby reducing battery consumption of the sensor unit 12. During this time period, the electronic control unit 20 uses the previously determined wheel load WL determined before the standstill period of the vehicle 1 as the current value of the wheel load WL for the respective wheel.

LIST OF REFERENCE SIGNS 1 vehicle
W1 to W4 vehicle wheels
10-1 to 10-4 vehicle-based sensor units
12-1 to 12-4 wheel-based sensor units
D1 to D4 data signals
R1 to R4 RF data signals
14 pressure sensor
15 acceleration sensor
16 digital storage
17 processing unit
18 RF transmitter
20 electronic control unit (ECU)
22 digital storage
24 data processing unit
40 RF receiver
WL wheel load
dWL change of wheel load
11 to 14 tire footprint lengths

The invention claimed is:

1. A method for determining a wheel load acting on a vehicle wheel having a rim, a tire mounted onto the rim and a sensor unit mounted at the wheel, the method comprising the following steps:
 a) using the sensor unit for determining a tire pressure of the tire;
 b) using the sensor unit when the vehicle is driving for determining a tire footprint of the tire;
 c) determining a wheel load based on a predetermined relationship between the wheel load, the tire pressure and the tire footprint;
 d) analyzing temporal variations of the tire pressure during a standstill period of the vehicle for determining one or more parameters indicating temporal variations of the tire pressure; and e) estimating a change of the wheel load during the standstill period based on the one or more determined parameters.

2. The method according to claim 1, which further comprises:
f) determining a current value of the wheel load after the standstill period based on the estimated change of the wheel load during the standstill period and the wheel load determined in step c).

3. The method according to claim 1, which further comprises determining the tire pressure in step a) with an accuracy of better than 2.5 kpa.

4. The method according to claim 1, which further comprises determining the tire footprint in step b) by:
b1) determining a rotational speed of the wheel;
b2) analyzing a temporal variation of a sensor signal determined by the sensor unit; and
b3) determining the tire footprint based on a predetermined relationship between the tire footprint, the rotational speed and the temporal variation of the sensor signal.

5. The method according to claim 1, which further comprises determining the wheel load in step c) by retrieving the wheel load from a look-up table representing the relationship between the wheel load, the tire pressure and the tire footprint.

6. The method according to claim 1, which further comprises using the one or more parameters determined in step d) to indicate an occurrence of sudden changes of the tire pressure.

7. The method according to claim 6, wherein the sudden changes of the tire pressure include at least one of sudden rises or sudden falls of the tire pressure.

8. The method according to claim 6, which further comprises using the one or more parameters determined in step d) to indicate a number of the sudden changes.

9. The method according to claim 8, which further comprises using the one or more parameters determined in step d) to indicate an accumulated number of the sudden changes during the standstill period counted by a counter, increasing a value of the counter for a sudden rise of the tire pressure and decreasing the value of the counter for a sudden fall of the tire pressure or vice versa.

10. The method according to claim 6, which further comprises using the one or more parameters determined in step d) to indicate a quantitative value of the sudden changes.

11. The method according to claim 6, which further comprises using the one or more parameters determined in step d) to indicate a temporal variation of the tire pressure after the sudden changes.

12. The method according to claim 1, which further comprises carrying out the step of estimating the change of the wheel load in step e) by calculating a change of the wheel load based on one or more mathematical equations.

13. A method for determining a weight of a vehicle including a plurality of wheels each having a rim, a tire mounted onto the rim and a sensor unit mounted at the wheel, the method comprising the following steps:
A) determining a wheel load of each of the wheels by using the method according to claim 1; and
B) determining the weight of the vehicle based on the determined wheel loads of the wheels.

14. The method according to claim 13, which further comprises:
C) analyzing correlations between the one or more parameters determined in step d) for one of the wheels and the parameters determined in step d) for at least one other wheel of the plurality of wheels; and
D) improving a quality of the estimation in step e) based on a result of the analysis in step C).

15. A non-transitory computer-readable medium with instructions stored thereon, that when executed by a processor, perform the steps of claim 1.

16. A non-transitory computer-readable medium with instructions stored thereon, that when executed by a processor, perform the steps of claim 13.

17. A device for determining a wheel load acting on a vehicle wheel having a rim, a tire mounted onto the rim and a sensor unit mounted at the wheel, the device comprising:
a) means for determining a tire pressure of the tire by using the sensor unit;
b) means for determining a tire footprint of the tire by using the sensor unit, when the vehicle is driving;
c) means for determining a wheel load based on a predetermined relationship between the wheel load, the tire pressure and the tire footprint;
d) means for analyzing temporal variations of the tire pressure during a standstill period of the vehicle for determining one or more parameters indicating the temporal variations of the tire pressure; and
e) means for estimating a change of the wheel load during the standstill period based on the one or more determined parameters.

18. The device according to claim 17, which further comprises:
f) means for determining a current value of the wheel load after the standstill period based on the estimated change of the wheel load during the standstill period and the wheel load determined by the means for determining the wheel load.

19. A device for determining a weight of a vehicle including a plurality of wheels each having a rim, a tire mounted onto the rim and a sensor unit mounted at the wheel, the device comprising:
A) means for determining a wheel load of each of the wheels by using the device according to claim 17; and
B) means for determining the weight of the vehicle based on the determined wheel loads of the wheels.

* * * * *